US005296175A

United States Patent [19]

Iwasaki et al.

[11] Patent Number: 5,296,175

[45] Date of Patent: Mar. 22, 1994

[54] METHOD OF FORMING MOLDED BODY

[75] Inventors: Hiroyuki Iwasaki; Syuji Sakai, both of Nagoya, Japan

[73] Assignee: NGK Insulators, Ltd., Japan

[21] Appl. No.: 916,269

[22] Filed: Jul. 21, 1992

Related U.S. Application Data

[62] Division of Ser. No. 126,168, Nov. 27, 1987, Pat. No. 5,156,896.

[30] Foreign Application Priority Data

Dec. 4, 1986 [JP] Japan ............................ 61-287627
Mar. 10, 1987 [JP] Japan ............................ 62-54989

[51] Int. Cl.$^5$ ............................ C04B 33/28

[52] U.S. Cl. ............................ 264/86; 264/87

[58] Field of Search ............................ 264/86, 87

[56] References Cited

U.S. PATENT DOCUMENTS 399,064 5/1889 McLean ............................ 249/113
3,019,505 2/1962 van den Berge et al. .
4,401,613 8/1983 Abell et al. ............................ 264/86
4,735,756 4/1988 Rausch ............................ 264/86
4,913,868 4/1990 Ito ............................ 425/85

FOREIGN PATENT DOCUMENTS 864676 12/1952 Fed. Rep. of Germany .
1127781 4/1962 Fed. Rep. of Germany .
1584738 3/1970 Fed. Rep. of Germany .
50-160317 12/1975 Japan .
56-14451 4/1981 Japan .
61-77205 5/1986 Japan .
62-227702 10/1987 Japan .
719498 12/1954 United Kingdom ............................ 264/86
790027 1/1958 United Kingdom .
1342890 1/1974 United Kingdom ............................ 264/86
2011798 7/1979 United Kingdom ............................ 264/86

*Primary Examiner*—James Derrington
*Attorney, Agent, or Firm*—Parkhurst, Wendel & Rossi

[57] ABSTRACT

A mold for forming a molded body from a slurry including an impermeable mold part having a cavity for retaining the slurry and a permeable mold provided on a side of a molding surface with a membrane filter. A method of forming a molded body from a slurry includes steps of introducing the slurry into a cavity of a mold including an impermeable mold part and a permeable mold part provided on a side of a molding surface with a membrane filter, and removing a solvent medium of the slurry through the permeable mold part. A pressure casting molding method of forming a high dense ceramic molded body by pouring a ceramic slurry into a mold through a pouring portion thereof and pressurizing the ceramic slurry on a side of the pouring portion while removing a solvent medium of the slurry on the other side of the mold through a permeable mold part of the mold. The method includes steps of filling a hydrophobic pressurizing medium in the pouring portion after pouring the ceramic slurry into the mold for pressurizing the ceramic slurry through the hydrophobic pressuring medium, and/or removing the solvent medium and/or removing the solvent medium through a membrane filter provided on a side of a molding surface of said permeable mold part of the mold.

6 Claims, 6 Drawing Sheets

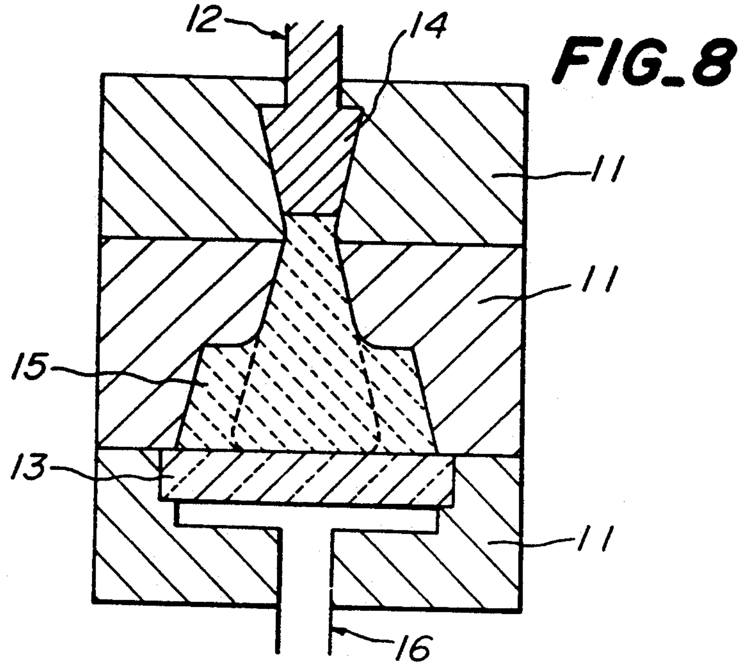
FIG_8
FIG_9
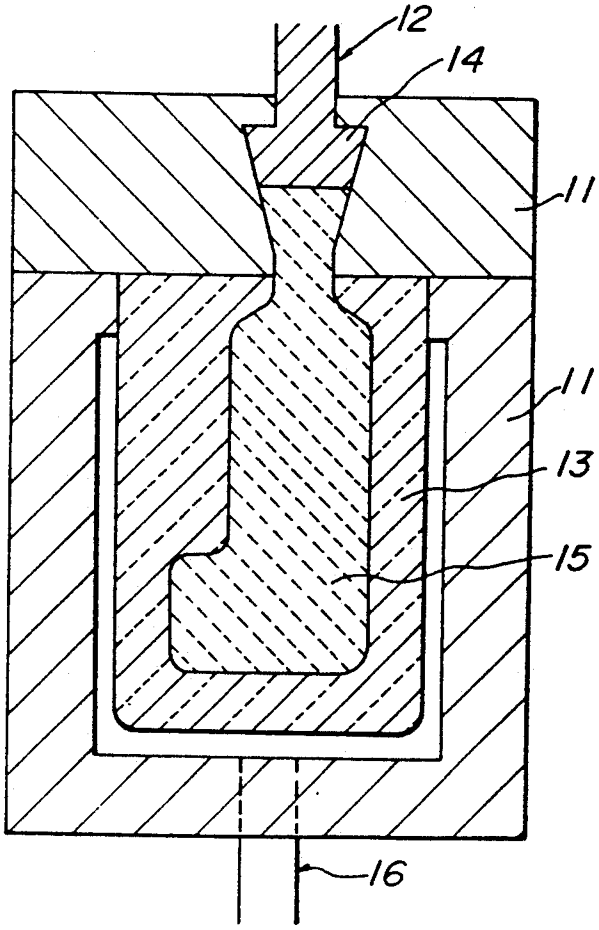

METHOD OF FORMING MOLDED BODY

This application is a divisional application of Ser. No. 07/126,168 filed Nov. 27, 1987, now U.S. Pat. No. 5,156,856.

BACKGROUND OF THE INVENTION

This invention relates to a mold using a membrane filter for forming ceramic bodies, a method for forming ceramic bodies by the use of the mold and/or a pressure casting molding method for ceramic bodies by means of a hydrophobic medium.

Molds made of plaster, synthetic resins, ceramics and the like have been known for forming inorganic materials such as ceramic materials and the like into predetermined shapes by means of potters wheels or by casting, wet press forming and the like. Such molds generally have a permeability to remove a solvent medium included in a forming body (slurry) of the inorganic material such as a ceramic material. Dewatering and mold release of a molded body are effected by suction or pressurizing. In other cases, the dewatering and mold release are effected by congregating particles of the blank material with the aid of ion exchange between ions in the mold and the slurry at surfaces of the mold.

Recently, a forming mold has been proposed which is of a two layered construction consisting of an outer layer having coarse pores and an inner layer having fine pores in order to prevent blank material particles from entering the mold to prevent the mold from being clogged and to improve the dewatering efficiency (Japanese Patent Application Publication No. 14,451/81).

In recent years, the pressure casting molding method has been noticed. With such a pressure casting method, as shown in FIGS. 1 and 2 a ceramic slurry 25 is poured through a pouring portion 22 into a mold 27 having a required inner cavity and the poured slurry 25 in the cavity is pressurized by a gas such as air introduced through the pouring portion 22 to remove a solvent medium through a permeable mold 23 at the other end of the mold, thereby obtaining a ceramic molded body of a high density.

However, these molds of the prior art have the following disadvantages. The plaster mold is poor in mechanical strength and therefore the mold can be repeatedly used only very few times. Moreover, the mold of a synthetic resin or a ceramic material is likely to be clogged every time when it is used and therefore cleaning of the mold is required. As the number of times the mold is used increases, the time required for casting is progressively increased, thus lowering the moldability of the material. Further, as it is difficult to obtain desired fine pores, the time required for casting is different for each mold so that control of a number of molds is difficult.

On the other hand, with the mold consisting of two layers, these layers are substantially integrally formed, so that the clogging of pores is not eliminated. Moreover, as the number of times the mold is used increases, the moldability decreases.

Furthermore, with the pressure casting of the prior art above described, the cast slurry is directly pressurized by air, gas and the like, so that when the pressure is higher than 10 kg/cm$^2$, the use of the mold is limited by high pressure gas regulations and there is a large risk of explosion or the like. Accordingly, this kind of the mold is difficult to use.

In order to simplify the release of a molded body from the impermeable mold or to simplify the release of the molded body from the permeable mold after removal of a solvent medium, surfaces of the impermeable or permeable mold in contact with a ceramic slurry are previously coated with a mold release agent. However, the mold release agent is extended through the permeable mold by pressurizing or by pressurizing and sucking in pressure casting, so that the release of the molded body from the impermeable or permeable mold becomes difficult. The release of the molded body often becomes more difficult dependent upon the shape and size of the molded body.

Moreover, when the slurry is pressurized by the air through the pouring portion to remove the solvent medium through the permeable mold, the air passes through parts of boundary surfaces between the impermeable or permeable mold and the molded body which is about to complete its molding. Therefore, the parts of the boundary surfaces are locally promptly dried so that cracks tend to occur in these parts.

SUMMARY OF THE INVENTION

It is a principal object of the invention to provide an improved mold for forming a molded body from a slurry, a method of forming such a molded body and a pressure casting molding method of forming a high dense ceramic molded body, which eliminate all the disadvantages of the prior art.

In order to achieve the object, a mold for forming a molded body from a slurry according to the invention comprises an impermeable mold part including a cavity for retaining said slurry and a permeable mold having a permeability provided on a side of a molding surface with a membrane filter.

In a second aspect of the invention, a method of forming a molded body from a slurry comprises steps of introducing said slurry into a cavity of a mold comprising an impermeable mold part and a permeable mold part provided on a side of a molding surface with a membrane filter, and removing a solvent medium of said slurry through said permeable mold part.

In a third aspect of the invention, a pressure casting molding method of forming a high dense ceramic molded body by pouring a ceramic slurry into a mold through a pouring portion thereof and pressurizing the ceramic slurry on a side of the pouring portion while removing a solvent medium of said slurry on the other side of the mold through a permeable mold part of the mold, comprises at least one of the steps of filling a hydrophobic pressurizing medium in said pouring portion after pouring said ceramic slurry into the mold for pressurizing the ceramic slurry through said hydrophobic pressurizing medium, and removing the solvent medium through a membrane filter provided on a side of a molding surface of said permeable mold part of the mold.

The invention will be more fully understood by referring to the following detailed specification and claims taken in connection with the appended drawings.

BRIEF DESCRIPTION OF THE DRAWINGS

FIGS. 8 and 9 are sectional views illustrating molds for carrying out the pressure casting molding method using a hydrophobic pressurizing medium according to the invention.

DESCRIPTION OF THE PREFERRED EMBODIMENTS

Figure 1:
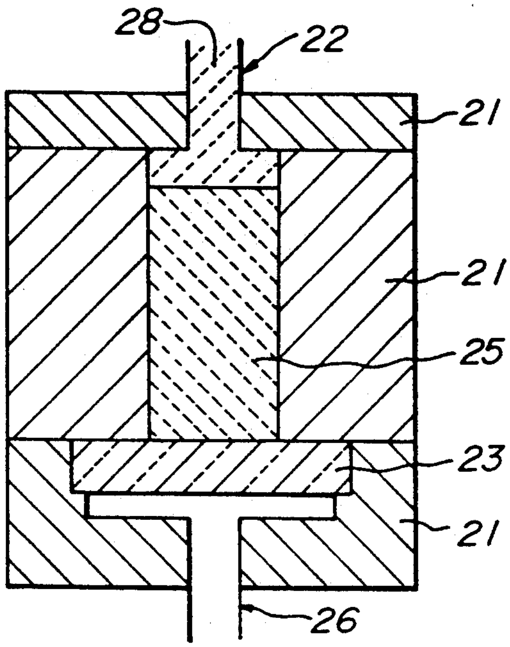
FIG 1 PRIOR ART
FIGS. 1 and 2 are sectional views for explaining general ideas of prior art pressure casting molding methods.
Figure 2:
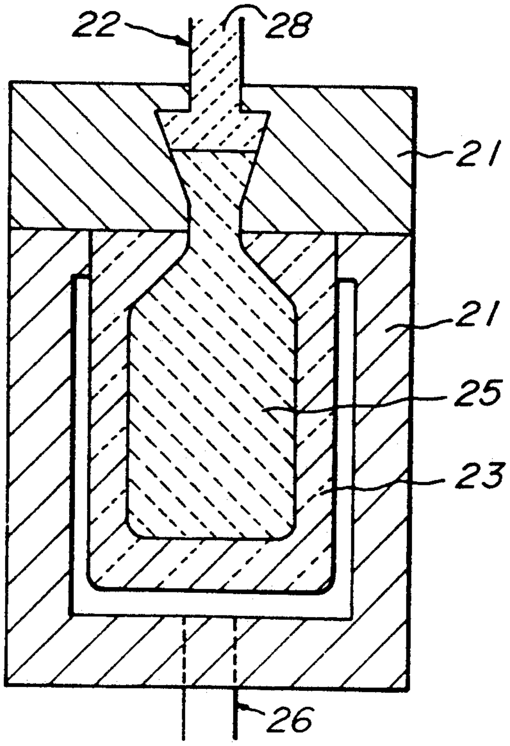
FIG 2 PRIOR ART

The mold according to first and second aspect of the invention comprises a membrane filter on a side of a forming surface of a permeable mold part. In other words, the membrane filter is provided separately from the permeable mold part and is adapted to be brought into close contact with the permeable mold part by vacuum suction. The close contact may be accomplished by wetting the filter with water or heating the filter.

With this arrangement, the filter becomes exchangeable and cleaning of the permeable mold itself is not needed. As a result, a moldability of the mold can be stably kept.

Although the material of the membrane filter is not limited to a particular material, the following materials are generally preferably used, such as a filter paper made of a cellulose fiber, a cellulose derivative, a synthetic fiber, a synthetic resin, a glass fiber, a silica fiber, an asbestos fiber or the like, a filter cloth made of a cotton, a wool, a synthetic fiber or the like, and a metal gauze.

Moreover, it is preferred to be able to determine opening diameters of the membrane filter when manufacturing them. Such a membrane filter is of a screen type, for example, membrane filters, metal sieves, metal gauzes and the like.

The screen type membrane filter preferably has average opening diameters of 0.1–25 μm and more preferably 0.3–15 μm. If the average opening diameters are less than 0.1 μm, the removal of a solvent medium when molded is so difficult that defects of molded bodies tend to occur. On the other hand, average opening diameters of more than 25 μm permit fine particles in a slurry to pass through the filter so that there is a risk that the composition of the molded body may change.

With membrane filters wherein it is unable to measure pore diameters other than those of the screen type, it is preferable to have a particle retention of 1–10 μm. If the particle retention is less than 1 μm, the casting time is increased. The particle retention more than 10 μm may permit fine particles to pass through the filter.

The term "particle retention" in this case is intended to mean the particle retaining performance of paper filters in a chemical precipitation process (JIS-P 3801).

The thickness of the membrane filter is preferably less than 1 mm, more preferably less than 0.5 mm. It is difficult to apply a membrane filter having a thickness of more than 1 mm to a permeable mold having a curved surface.

As can be seen from the above description, it is preferable for the membrane filter to be flexible. Moreover, it is preferable for the filter to previously have a configuration meeting with that of a permeable part.

Further, it is sufficient for a permeable mold part to be provided with a membrane filter, but it is preferable to make the membrane filter in close contact with the mold part in order to obtain a more accurate shape of a molded body. By bringing the membrane filter into close contact with the permeable mold part, the solvent medium in the molded body can be uniformly removed to obtain a more homogeneous molded body.

The permeable mold part with which the membrane filter is in close contact may be publicly known mold parts. The permeable mold part should be highly air-permeable for prompt drying and effective removal of the solvent medium, and should have a sufficient strength. Mold parts having coarse pore diameters of 50–500 μm are usually used. The material of the permeable mold part is not limited to a particular one. However, in case that casting is effected under atmospheric pressure without any suction at an exhaust portion, it is necessary to use a material such as plaster which has a plurality of fine pores and a high water absorbing power. In case of pressure casting, on the other hand, a resin, a ceramic material, a metal and a composite material thereof may be used for the permeable mold part.

In case of casting molding according to the second aspect of the invention, a slurry (a blank material including a solvent medium) is introduced into a cavity of the mold, and thereafter the solvent medium is removed from an exhaust portion through a membrane filter and a permeable mold part with or without suction to obtain an article as a molded body.

A constituent of a slurry (or component of a blank material) generally includes an inorganic material such as a ceramic material, water or an organic solvent as a solvent medium, and a forming aid (binder, deflocculant, lubricant, anti-foaming agent or the like). Such a slurry is used to produce ceramic turbine rotors and the like.

In pressure casting according to the third aspect of the invention, a mold for this purpose is similar to the mold for atmospheric pressure casting described above with exception of having a slurry pouring portion needed for the pressure casting.

It is of course possible to effect the atmospheric pressure casting by the use of the mold having the slurry pouring portion for the pressure casting.

Molding conditions using the molds described above will be explained hereinafter.

The solvent medium to be in the slurry is usually of 15–70 weight %, preferably 25–60 weight %. The viscosity of the slurry is usually 0.01–$10^5$ poise, preferably 0.1–$10^3$ poise.

The pressure for pressurizing the slurry at the pouring portion is preferably more than 5 kg/cm$^2$, more preferably more than 10 kg/cm$^2$. If the pressure is lower than 5 kg/cm$^2$, the removal of the solvent medium at the exhausting portion is detrimentally affected thereby requiring a longer casting time. In order to obtain the pressure of more than 10 kg/cm$^2$, a hydraulic or pneumatic method may be used. However, the pneumatic method is regulated in use by high pressure gas regulation and therefore, the hydraulic method is preferable.

It is possible to use a pressure of higher than 500 kg/cm$^2$. With such high pressure, however, the mold becomes unavoidably bulky and heavy and becomes difficult to operate. Therefore, a pressure lower than 200 kg/cm$^2$ is preferable.

The mold and molding method according to the invention will be explained by referring to the attached drawings.

Figure 3:
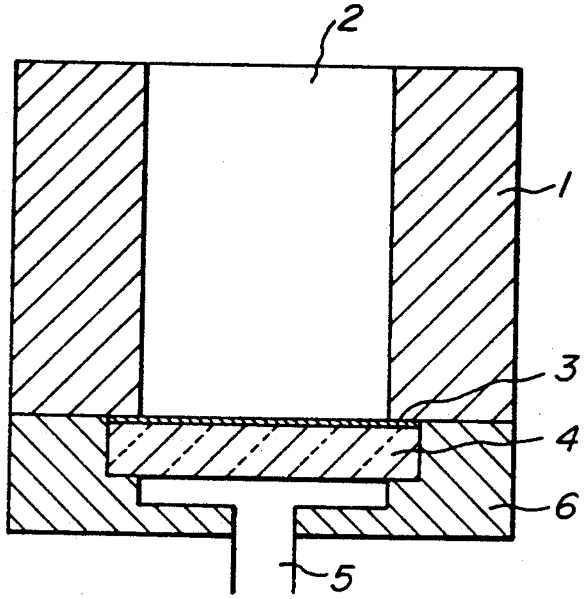
FIG. 3 is a sectional view of one embodiment of the mold according to the invention.

Referring to FIG. 3 which is a sectional view of a mold of one embodiment of the invention, the mold comprises an impermeable mold part 1 including a cavity 2 surrounded thereby, a permeable mold part 4 closely covered on its surface by a membrane filter 3 under the impermeable mold part 1, an exhaust portion 5 under the permeable mold part 4. The membrane filter 3, the permeable mold part 4 and the exhaust portion 5 are integrally surrounded by an impermeable mold part 6. It is of course to form the cavity 2 so as to commensurate with a required molded body. Moreover, the impermeable mold parts 1 and 6 are made in separate parts in order to simplify the manufacturing and operation of these parts.

Figure 4:
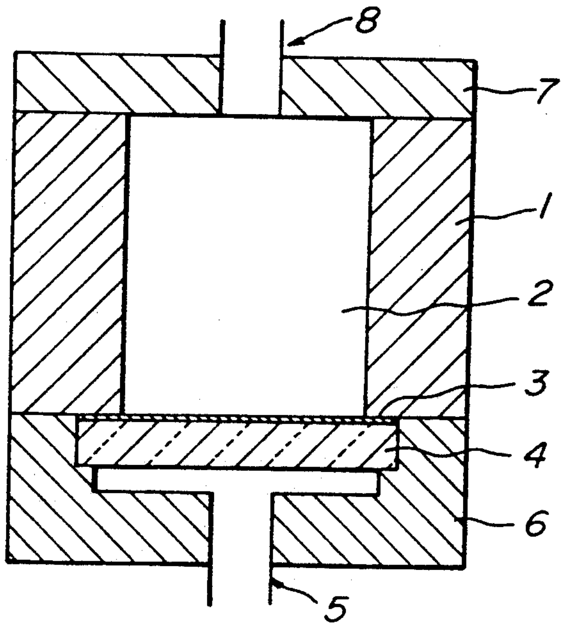
FIG. 4 is a sectional view of another embodiment of the mold according to the invention.

FIG. 4 is a mold of one embodiment of the third aspect of the invention, which is similar to the mold shown in FIG. 3 with exception of a pouring portion 8 provided on a cavity 2 and surrounded by an impermeable mold part 7 formed separately form impermeable mold parts 1 and 6. This mold is mainly used as a mold having a membrane filter 3 for the pressure casting.

Figure 5:
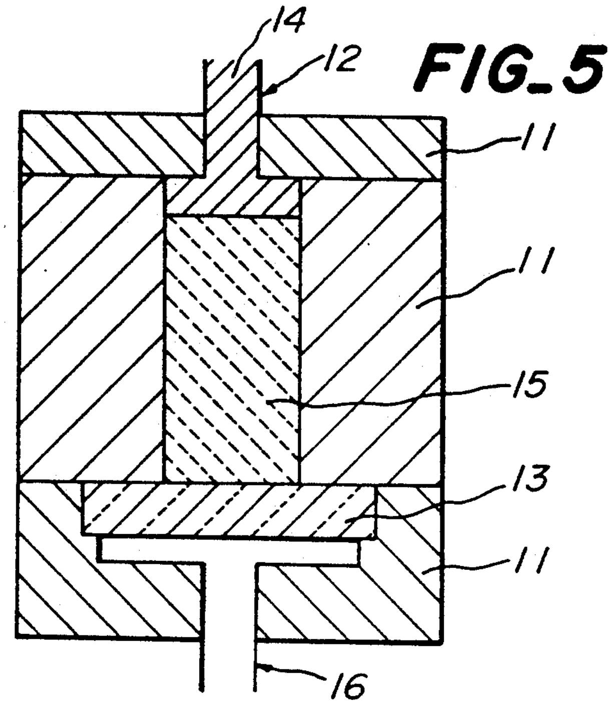
FIGS. 5 and 6 are sectional views for explaining the pressure casting molding method according to the invention.

FIG. 5 is a sectional view for explaining an outline of the pressure casting forming method using a hydrophobic pressurizing medium according to the third aspect of the invention. A mold shown in FIG. 5 comprises an impermeable mold part 11, a pouring portion 12 for pouring a ceramic slurry 15 pressurized by a hydrophobic pressurizing medium 14, a permeable mold part 13, and an exhaust portion 16 for sucking a solvent medium through the permeable mold part 13. The hydrophobic pressurizing medium is preferably liquid and flowable and is not mixed with water. For example, animal or plant oils such as olive oil, colza oil or the like and lubricants for machine tools such as daphne-supermulti 32 (trade name) are preferably used. The permeable mold part is made of a resin, a ceramic material, a metal and a composite material thereof and plaster. The mold using a membrane filter according to the invention may be used. The impermeable mold part is preferably made of a material impermeable and resistant to a pressurizing pressure such as a metal, a hard acrylic resin, a ceramic material or the like. The pressurizing may be effected by pressurizing the hydrophobic pressurizing medium by means of a piston or the like or by directly pressurizing the medium by the use of a hydraulic pump or the like.

The actual pressure casting operation is carried out with the above arrangement in the following manner.

A predetermined ceramic slurry 15 for forming a molded body is poured through the pouring portion 12 into the mold. Then the hydrophobic pressurizing medium 14 such as olive oil or the like is filled in the pouring portion 12. Thereafter., the pressurizing medium 14 is pressurized from above the pouring portion 12 b means of hydraulic means or the like, while water content in the ceramic slurry 15 is sucked through the permeable mold part 13 and the exhaust portion 16 by means of vacuum means such as a vacuum pump or decompression means such as a water pump. In this case, the suction through the exhaust portion by the vacuum or decompression is not essential and can be omitted. However, the suction is rather preferable in order to improve the shape retention of molded bodies. The pressure to be applied at the pouring portion 12 may be constant. However, in order to prevent cracks in molded bodies, it is preferable to change the pressure on the way of pressurizing depending upon shapes of the molded bodies and position of the permeable mold part. In this case, the hydrophobic pressurizing medium 14 enters between the impermeable mold part 11 and surfaces of the molded part when the formation of the body is completed, so that the medium 14 serves as a mold release agent to facilitate releasing the molded body from the mold.

As the part of the molded body in contact with the permeable mold part 13 is a simple in shape, the mold release is easily effected by pressurizing that part of the molded body with air or the like through the exhaust portion 16. The pressure through the exhaust portion 16 may be a slight pressure as 2–3 kg/cm$^2$.

Figure 6:
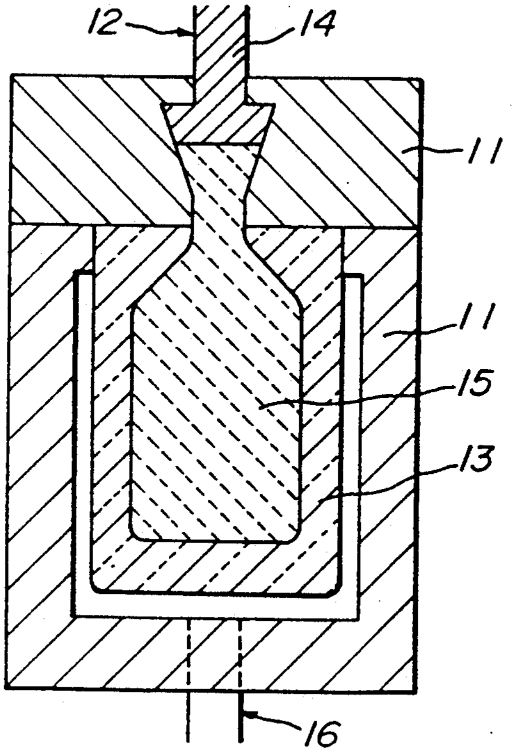

In case that the ceramic slurry is directly pressurized by the air, if the hydrophobic pressurizing medium 14 such as the olive oil or the like is poured after completion of formation of the body, the air enters between the molded body and the impermeable mold part 11 to locally dry the molded body so as to cause cracks in the body. It is therefore preferable to pour the hydrophobic pressurizing medium 14 such as the olive oil or the like before the completion of formation of the body. Moreover, the amount of the hydrophobic pressurizing medium 14 to be poured must be suitably determined on the basis of the shape and size of the molded body and the force and time for the pressurization. In other words, an amount of the hydrophobic pressurizing medium at least covering all surfaces of the molded body is required FIG. 6 is a sectional view illustrating an embodiment of the mold whose permeable mold part is in contact with a molded body with areas as much as possible. Like components in FIG. 6 are designated by the same reference numerals as those in FIG. 5 and will not be described in further detail.

A predetermined amount of slurry 15 to be molded is poured through a pouring portion 12 into the mold. The amount of the slurry must be determined on the basis of shape and thickness of the body to be molded. A hydrophobic pressurizing medium 14, such as olive oil, is filled in the pouring portion 12 and pressurized from above the pouring portion 12 by means of a hydraulic unit or the like, while a water in the ceramic slurry 15 is sucked through a permeable mold part 13 and an exhaust portion 16 by means of a vacuum unit as a vacuum pump or the like. As the ceramic material in the slurry are progressively attached to the permeable mold part, a liquid surface at the top of the hydrophobic pressurizing medium 14 lowers and arrives at the permeable mold part, so that the hydrophobic pressurizing medium 14 is sucked through parts of the permeable mold part 13. In this case, the pressurizing medium 14 is caused to pass through the parts of the permeable mold part 13 without suction by the vacuum unit. In case of using the suction by the vacuum unit, the suction through the exhaust portion 16 is stopped and the pressurizing from the pouring portion 12 is mitigated or stopped, so that the hydrophobic pressurizing medium 14 enters between the molded body and the permeable mold part 13 and serves as a mold releasing agent to facilitate the mold release.

In order to more easily facilitate the entrance of the hydrophobic pressurizing medium 14, it is preferable to pressurize from the exhaust portion 16 in addition to the stoppage of the suction through the exhaust portion 16.

However, it is necessary to pressurize from the exhaust portion 16 with a pressure not obstructing the entrance of the hydrophobic pressurizing medium 14, taking a precaution that the water in the permeable mold part 13 does not damage the molded body and does not affect the mold release because the water in th permeable mold part 13 flows toward the molded body. Moreover, the pressure when the pressurizing from the pouring portion 12 is mitigated must be determined depending upon a shape of molded body and size of pores in the permeable mold part 13. After the pressurizing from the pouring portion 12 is once stopped, the pressurizing may be again started. The pressure for this purpose must be determined depending upon the shape of molded body and size of pores in the permeable mold part 13.

After the ceramic slurry 15 remained in the mold and the hydrophobic pressurizing medium 14 have been exhausted through the pouring portion 12, the molded body is easily released by pressurizing with air through the exhaust portion 16.

The invention will be explained in more detail on the basis of embodiments hereinafter. The invention is of course not limited to these embodiments.

EXAMPLE 1

SiC powder (average diameter of 1 μm) including a sintering aid of 100 parts by weight was mixed with 45 parts by weight of water, 0.8 part by weight of poly-acrylic ammonium (deflocculant) and 0.25 part by weight of octyl alcohol (anti-foaming agent) to obtain a slurry whose pH was 11.50 and viscosity was 12 poise.

In order to remove air bubbles in the slurry, the slurry was agitated under a vacuum of 70 cmHg for five minutes to effect vacuum deairing.

Figure 7:
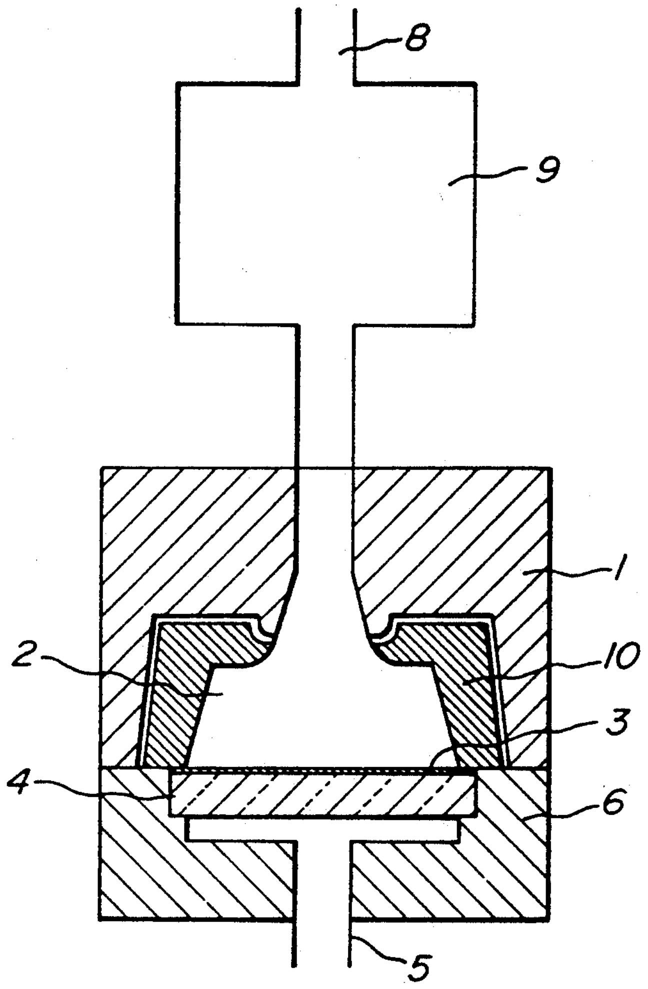
FIG. 7 is a sectional view illustrating a further embodiment of the mold according to the invention.

The slurry was poured into a cavity 2 of a pressure casting mold for turbine rotors shown in FIG. 7 through a pouring portion 8 and a slurry reservoir 9. Thereafter, the pressurization was effected through the pouring portion 8 and dewatering was carried out through an exhaust portion 5 by suction.

In this Example, a permeable mold part 4 included fine pores of average diameters of 120 μm. A membrane filter 3 was of the screen type whose thickness was 0.1 mm and diameter of pores was 3 μm. Continuous pressure casting was carried out with pressure of 100 $kg/cm^2$. The membrane filter was replaced by new one every time when molding. Results of the molding are shown in Table 1a.

TABLE 1a

| | Permeable mold part | Membrane filter | Pressure of pressurization ($kg/cm^2$) | Times of continuous casting | Time for casting (minute) | Observation |
|---|---|---|---|---|---|---|
| Present invention | Average diameter of pores: 120 μm | Screen type, average diameter of pores: 3 μm | 100 | 1 | 35 | No defect |
| | Average diameter of pores: 120 μm | Screen type, average diameter of pores: 3 μm | 100 | 3 | 32 | " |
| | Average diameter of pores: 120 μm | Screen type, average diameter of pores: 3 μm | 100 | 12 | 36 | " |
| | Average diameter of pores: 120 μm | Screen type, average diameter of pores: 3 μm | 100 | 68 | 38 | " |

TABLE 1b

| | Two-layer permeable mold part | | Pressure of pressurization | Times of continuous | Time for casting | |
|---|---|---|---|---|---|---|
| | First layer | Second layer | ($kg/cm^2$) | casting | (minute) | Observation |
| Comparative example | Average diameter of pores: 3.6 μm | Average diameter of pores: 250 μm | 100 | 1 | 45 | No defect |
| | Average diameter of pores: 3.6 μm | Average diameter of pores: 250 μm | 100 | 3 | 55 | No defect |
| | Average diameter of pores: 3.6 μm | Average diameter of pores: 250 μm | 100 | 6 | 53 | Deformations at two locations of blade portion |
| | Average diameter of pores: 3.6 μm | Average diameter of pores: 250 μm | 100 | 12 | 65 | Failure in forming: insufficient filling at blade portion |

For comparing the invention with the prior art, other bodies were formed in ceramic molds. A permeable mold part of each ceramic mold consisted of two layers. A first layer had an average diameter of pores of 3.6 μm and was arranged on the side of the molded body. A second layer had an average diameter of pores of 250 μm. The continuous pressure casting was effected by pressure of 100 $kg/cm^2$. Results are shown in Table 1b.

As can be seen from Tables 1a and 1b, with the molds according to the invention, the time required for casting substantially does not change even if the times of casting are increased. Therefore, the continuous casting is possible with the molds according to the invention. The molded bodies, themselves, are good without cracks, insufficient filling or deformations.

The cavity of the pressure casting mold shown in FIG. 7 corresponds to the shape of the turbine rotor having a blade diameter of 80 mm and a blade height of 35 mm.

EXAMPLE 2

$Si_3N_4$ powder (average diameter of 0.7 μm) including a sintering aid of 100 parts by weight was mixed with 50 parts by weight of water, 1 part by weight of polyacrylic acid (deflocculant) and 0.5 part by weight of octyl alcohol (anti-foaming agent) by means of a pot mill to obtain a slurry.

In order to remove air bubbles in the slurry, the slurry was agitated under a vacuum of 75 cmHg for five minutes to effect vacuum deairing.

The slurry of 230 cc was poured into the cavity 2 of the pressure casting mold shown in FIG. 4 through the pouring portion 8. Thereafter, the pressurization was effected through the pouring portion 8 and dewatering was carried out through the exhaust portion 5 by suction to complete the molding. The molding was effected with a membrane filter under the pressurizing conditions shown in Table 2, which also shows showing results of the molding.

TABLE 2

| | No. of experiment | Filter | Average diameter of pores (μm) | Pressure of pressurization ($kg/cm^2$) | Time for casting (minute) | Density of molded body ($g/cm^3$) | Strength of sintered body ($kg/mm^2$) | Bulk density of sintered body |
|---|---|---|---|---|---|---|---|---|
| Example 2 | 1 | Membrane filter | 0.1 | 5 | 25 | 1.75 | 98 | 3.21 |
| | 2 | " | 0.3 | 2 | 70 | 1.75 | 102 | 3.22 |
| | 3 | " | 1.2 | 5 | 19 | 1.76 | 100 | 3.22 |
| | 4 | " | 1.2 | 10 | 9 | 1.74 | 99 | 3.22 |
| | 5 | " | 5.0 | 12 | 8 | 1.75 | 99 | 3.23 |
| | 6 | " | 8.0 | 7 | 13 | 1.74 | 97 | 3.24 |
| | 7 | " | 17 | 2 | 60 | 1.74 | 96 | 3.22 |
| | 8 | " | 25 | 5 | 12 | 1.70 | 96 | 3.20 |
| | 9 | " | 44 | 3 | 32 | 1.65 | 90 | 3.15 |
| | 10 | Filter paper | 7*) | 3 | 35 | 1.73 | 97 | 3.20 |
| | 11 | Filter cloth | 10*) | 5 | 28 | 1.73 | 96 | 3.20 |

*): values of particle retention

Dimensions of the mold shown in FIG. 4 are as follows.

Cavity 2 : 55 mm diameter
100 mm height
Membrane filter 3 : refer to Table 2
Permeable mold part 4 : 60 mm diameter
15 mm thickness
50 μm average pore diameter
Impermeable mold part (1, 6 and 7): Cylindrical shape having outer diameter of 100 mm
Total height : 150 mm Molded bodies obtained in the above manner did not contain any defects.

After the molded bodies were dried, they were kept in an electric furnace at 400° C. for three hours to remove the plasticizer. Thereafter, the bodies were fired at 1700° C. under $N_2$ atmosphere for three hours. Test pieces were cut out from the sintered bodies. Four point bending strengths and densities of the test pieces were measured by the testing method of ceramics according to JIS R 1601. Results are shown in Table 2.

From Table 2, it is clear that the time required for casting is shortened with higher pressure more than 5 $kg/cm^2$ in comparison with lower pressure such as 2 $kg/cm^2$. In the case where filters having pores of previously determined diameters such as membrane filters rather than filter papers or filter clothes were used, the time for casting is shorter and characteristics of sintered bodies are good. Further, it is clearly evident that the density of the sintered bodies are stabler in case of membrane filters having average pore diameters less than 25 μm.

EXAMPLE 3

Si powder (average particle diameter of 5 μm) including a sintering aid of 100 parts by weight was mixed with 35 parts by weight of water, 0.5 part by weight of polyacrylic acid and 0.5 part by weight of octyl alcohol to obtain a slurry. In order to remove air bubbles in the slurry, vacuum deairing on the slurry was effected.

The slurry of 140 cc was poured into the cavity 2 of the mold shown in FIG. 3. Without pressurizing, the dewatering was effected though the exhausting portion 5 by means of suction to complete the molding in 120 minutes. The used membrane filter 3 was made of nickel and had pores of 25 μm diameter.

Dimensions of the mold shown in FIG. 3 are as follows.

Cavity 2 : 50 mm diameter
80 mm height
Permeable mold part 4 : 60 mm diameter
10 mm thickness
500 μm average pore diameter
Impermeable mold part (1 and 6): Cylindrical shape having outer diameter of 100 mm
Total height : 150 mm After the obtained molded bodies were dried in a constant temperature and humidity bath, they were kept at 1400° C. in a $N_2$ atmosphere for twenty hours so as to be subjected to nitriding to obtain sintered bodies. The sintered bodies contained no defects such as cracks, deformations and the like.

Figure 10:
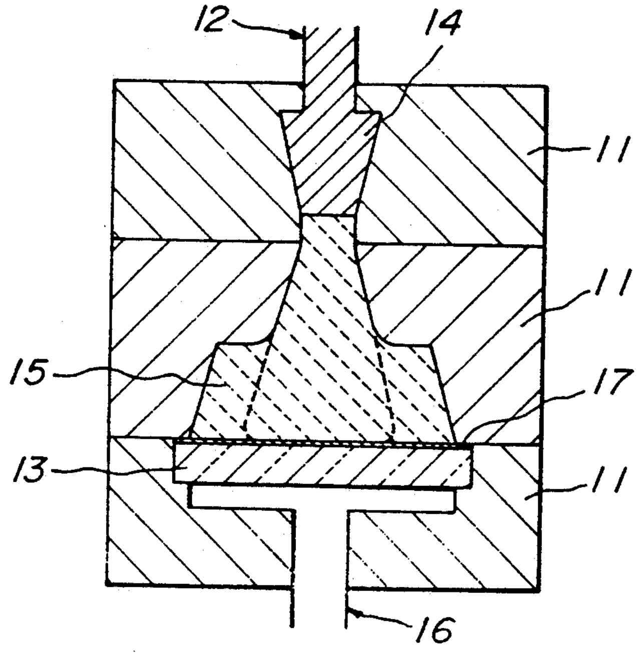
FIG. 10 is a sectional view illustrating one embodiment of the mold for the pressure casting molding method using a hydrophobic pressurizing medium according to the invention.

Actual examples using hydrophobic pressurizing mediums will be explained by referring to FIGS. 8, 9 and 10. In these drawings, like components are designated by the same reference numerals as those used in FIG. 5 and will not be described in further detail.

EXAMPLE 4

$Si_3N_4$ powder (average grain diameter of 0.7 μm) including a sintering aid of 100 parts by weight was mixed with 58 parts by weight of water, 1 part by weight of triethylamine (deflocculant) and 1.4 part by weight of a binder to obtain a slurry. In order to remove air bubbles in the slurry, the slurry was kept agitated in an atmosphere of 73 cmHg vacuum for five minutes to effect deairing. The slurry of 110 cc was poured into a pressure casting mold for turbine rotors shown in FIG. 8 through a pouring portion 12. Thereafter, daphne-super-multi 32 as a hydrophobic pressurizing medium was poured onto the slurry through the pouring portion 12. The hydrophobic pressurizing medium was pressurized at 70 kg/cm$^2$, while dewatering was effected by suction at an exhaust portion 16 to complete molding in 8 minutes. In this case, the mold releasing between the molded bodies and permeable and impermeable mold parts 13 and 11 was easy. Results of molding with the same slurry and with various molding conditions are shown in Table 3.

TABLE 3

| | Pressure of pressurization (kg/cm$^2$) | Pressurizing means | Pressurizing medium | Time required for molding (minute) | Mold release | Crack |
|---|---|---|---|---|---|---|
| Present invention | 5 | Air compressor | Daphne-super-multi 32 | 85 | Good | No |
| | 8 | " | Daphne-super-multi 32 | 68 | Good | No |
| | 10 | Hydraulic means | Daphne-super-multi 32 | 53 | Good | No |
| | 50 | " | Daphne-super-multi 32 | 18 | Good | No |
| | 70 | " | Daphne-super-multi 32 | 8 | Good | No |
| | 100 | " | Daphne-super-multi 32 | 5 | Good | No |
| Comparative example | 5 | Air compressor | Air | 80 | Bad | Occurred |
| | 8 | " | " | 55 | Bad | Occurred |

The obtained molded bodies were dried in a constant temperature and humidity bath (adjusting range 40° C., 80% to 60° C., 50%) and a constant temperature drier (100° C.) for 4 days. In order to remove a forming aid from the molded bodies, they were presintered in the air for 3 hours. Thereafter, the molded bodies were fired at 1750° C. in $N_2$ atmosphere for one hour. The obtained sintered bodies were uniform in bending moment at room temperature and density as shown in Table 4. The sintered bodies were of good quality having satisfactorily desired shapes and were without external defects. The bending strength at the room temperature was carried out by the three-point bending testing method according to the JIS-1601.

TABLE 4

| Sampling position | Bending strength (kg/mm$^2$) at room temperature | Bulk density |
|---|---|---|
| Upper portion of center | 97 | 3.22 |
| Lower portion of center | 101 | 3.20 |
| Side portion of center | 98 | 3.19 |
| Blade portion | — | 3.23 |

EXAMPLE 5

SiC powder (average particle diameter of 0.6 μm) including a sintering aid of 100 parts by weight was mixed with 45 parts by weight of water and 1 part by weight of triethylamine (deflocculant) to obtain a slurry. Vacuum deairing was the effected on the slurry in the same manner as in Example 4.

The slurry of 210 cc was poured into the pressure casting mold for turbine rotors shown in FIG. 8 and pressurized at a pressure of 20 kg/cm$^2$ from the pouring portion 12 by a piston type pressurizing device, while suction dewatering was effected on the slurry through the exhaust portion 16 for 30 minutes. Thereafter, excess slurry was removed through the pouring portion 12, and olive oil of 120 cc as a hydrophobic pressurizing medium was poured into the pouring portion 12. The olive oil was pressurized at 8 kg/cm$^2$ through the pouring portion 12, while suction dewatering was effected through the exhaust portion 16 for 5 minutes to complete the molding. When the molding was completed, the poured olive remained on the upper portion of the molded body.

The molded bodies were easy in mold releasing. After drying in the same manner as in Example 4, the molded bodies were fired at 2100° C. in Ar atmosphere for one hour to obtain molded bodies having a density of about 3.1 g/cm$^3$. These molded bodies were of good quality were uniform in density and had satisfactorily desired shapes without external defects.

EXAMPLE 6

A slurry was obtained in the same manner as in Example 4. The slurry of 520 cc was poured into a pressure casting split mold shown in FIG. 9 through a pouring portion 12. Then, daphne-super-hydraulic-fluid 32 as a hydrophobic pressurizing medium was poured into the pouring portion 12 and pressurized at 30 kg/cm$^2$ through the pouring portion 12 by means of hydraulic means, while suction dewatering was effected through an exhaust portion 16 for one minute. Thereafter, the suction dewatering was stopped and the pressurization was also stopped for one minute and then a pressurization at 3 kg/cm$^2$ was effected for 3 minutes to complete the molding. Remained slurry and daphne-super-hydraulic-fluid 32 in the mold were exhausted and mold release was effected, while applying pressure of 2 kg/cm$^2$ of the air through the exhaust portion 16. The obtained molded bodies were of good quality were easy to release from the mold and had no external defects. Thereafter, the bodies were subjected to drying, presintering and sintering in the same manner as in Example 4 to obtain sintered bodies having thicknesses of approximity 10 mm. The sintered bodies were of good quality had satisfactorily desired shapes without local differences in density and thickness and without external defects.

EXAMPLE 7

SiC powder including a sintering aid of 100 parts by weight was mixed with 60 parts by weight of water, 1 part by weight of triethylamine (deflocculant), 1.4 parts by weight of a binder and 0.2 part by weight of octyl alcohol (anti foaming agent) to obtain a slurry. In order to remove air bubbles in the slurry, the slurry was kept agitated in an atmosphere of 75 cmHg for 5 minutes to effect vacuum deairing. The slurry was (having a blade diameter of 80 mm and a blade height of 32 mm) shown in FIG. 10 through a pouring portion 12 and daphne-super-multi 32 as a hydrophobic pressurizing medium was poured into the pouring portion 12 and pressurized through the pouring portion 12 by means of hydraulic means, while suction dewatering was effected through an exhaust portion 16 to complete the molding. In molding, continuous pressure casting was effected using membrane filters and pressurizing conditions shown in Table 5. The membrane filter 17 was replaced after every molding. Results are shown in Table 5.

different in material are to be molded, the same mold can be used by replacing the membrane filter.

According to the third aspect of the invention, the pouring portion of the mold is filled with the hydrophobic pressurizing medium by means of which the pressurizing and dewatering are effected, so that the forming of a molded body can be securely and easily effected by pressurization with high pressure. After completion of the molding, the hydrophobic pressurizing medium enters between the molded body and permeable and impermeable molded bodies so as to serve as a mold releasing medium, so that mold release can be easily carried out and further the hydrophobic pressurizing medium prevents surfaces of the molded body from drying and therefore prevents cracks in the surfaces.

While the invention has been particularly shown and described with reference to preferred embodiments thereof, it will be understood by those skilled in the art that the foregoing and other changes in form and details can be made therein without departing from the spirit and scope of the invention.

TABLE 5

| Permeable mold part | Membrane filter | Pressure of pressurization (kg/cm$^2$) | Pressurizing means | Pressurizing medium | Times of continuous casting | Time for casting (minute) | Mold release | Crack |
|---|---|---|---|---|---|---|---|---|
| Average diameter of pores: 100 μm | Screen type, diameter of pores: 3 μm, thickness: 0.1 mm | 50 | Hydraulic means | Daphne-super-multi 32 | 1 | 25 | Good | No |
| Average diameter of pores: 100 μm | Screen type, diameter of pores: 3 μm, thickness: 0.1 mm | " | Hydraulic means | Daphne-super-multi 32 | 5 | 23 | Good | No |
| Average diameter of pores: 100 μm | Screen type, diameter of pores: 3 μm, thickness: 0.1 mm | " | Hydraulic means | Daphne-super-multi 32 | 25 | 26 | Good | No |
| Average diameter of pores: 100 μm | Screen type, diameter of pores: 3 μm, thickness: 0.1 mm | " | Hydraulic means | Daphne-super-multi 32 | 50 | 27 | Good | No |

As can be seen from Table 5, by the use of the mold and the pressure casting method with the hydrophobic pressurizing medium according to the invention, even if times of casting are increased, the time required for casting changes only within a very small range so that continuous casting can be effected. Molded bodies are easily released from the impermeable mold parts 11 and the membrane filters 17. The molded bodies are of good quality and contain no external defects.

As can be seen from the above explanation, according to the first and second aspects of the invention the mold comprises a permeable mold part having a membrane filter separately made therefrom and in close contact therewith. By exchanging the membrane filter with a new one every time when casting, the permeable mold part is not clogged so that cleaning of the mold itself is not necessary and stable molded bodies can be obtained even after the mold has been used for a long period of time. As a result, cost for producing molded bodies can be reduced.

According to the invention, any membrane filter can be used at will, so that the membrane filter can be easily adapted to molds for desired molded bodies. Moreover, materials, diameters of pores, shapes and like of the membrane filter can be easily selected according to particle sizes, pH and viscosity of slurries and materials of the blank powders. Therefore, even if molded bodies

What is claimed is:

1. A pressure casting molding method for forming a high density ceramic molded body by pouring a ceramic slurry into a mold through a pouring portion thereof and pressurizing the ceramic slurry on a side of the pouring portion while removing a solvent medium of said slurry on the other side of the mold through a permeable mold part of the mold, comprising the steps of filling a hydrophobic pressurizing medium in said pouring portion after pouring said ceramic slurry into the mold for pressurizing the ceramic slurry through said hydrophobic pressurizing medium, and removing the solvent medium through a membrane filter provided on a side of a molding surface of said permeable mold part of the mold.

2. A pressure casting molding method as set forth in claim 1, wherein said molded body is a ceramic turbine rotor.

3. A pressure casting molding method as set forth in claim 1, wherein pressurizing the ceramic slurry is effected at a pressure higher than 5 kg/cm$^2$.

4. A pressure casting molding method as set forth in claim 1, wherein said mold is a mold for solid casting.

5. A method of forming a molded body from a slurry, comprising the steps of:

providing an upper mold portion consisting of an impermeable material, said upper mold portion defining a cavity for retaining a slurry;

providing a lower mold portion in contact with said upper mold portion, said lower mold portion consisting of a permeable material having an average pore diameter of 50–500 μm, said lower mold portion structurally defining at least a portion of a molding surface of a body to be molded;

arranging a flexible membrane filter between said lower mold portion and said cavity such that said flexible membrane filter is immediately adjacent the molding surface of the body to be molded, said membrane filter having an average pore diameter of 0.1–25 μm;

introducing a slurry into said cavity; and removing a solvent medium of said slurry through said flexible membrane filter and said lower mold portion.

6. A method of forming a molded body from a slurry, comprising the steps of:

providing an upper mold portion consisting of an impermeable material, said upper mold portion defining a cavity for obtaining a slurry;

providing a lower mold portion in contact with said upper mold portion, said lower mold portion consisting of a permeable material having an average pore diameter of 50–500 μm, said lower mold portion structurally defining at least a portion of a molding surface of a body to be molded;

arranging a flexible membrane filter between said lower mold portion and said cavity such that said flexible membrane filter is immediately adjacent the molding surface of the body to be molded, said membrane filter having an average pore diameter of 0.1–25 μm;

introducing a slurry into said cavity;

pressurizing the slurry while in the mold by providing a hydrophobic medium in pressurized contact with the slurry; and removing a solvent medium of the slurry through said lower mold portion.

* * * * *